US009009826B1

(12) United States Patent
Sripracha

(10) Patent No.: US 9,009,826 B1
(45) Date of Patent: Apr. 14, 2015

(54) IMAGE SIZE COMMUNICATION

(71) Applicant: Amazon Technologies, Inc., Reno, NV (US)

(72) Inventor: Ram Sripracha, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 14 days.

(21) Appl. No.: 13/973,813

(22) Filed: Aug. 22, 2013

(51) Int. Cl.
*H04L 29/06* (2006.01)

(52) U.S. Cl.
CPC ............ *H04L 63/14* (2013.01); *H04L 63/0236* (2013.01); *H04L 63/0227* (2013.01)

(58) Field of Classification Search
CPC .. H04L 63/14; H04L 63/0227; H04L 63/0236

USPC .......................................................... 726/22
See application file for complete search history.

(56) References Cited

U.S. PATENT DOCUMENTS

2008/0098301 A1\* 4/2008 Black et al. ................... 715/246
2008/0306824 A1\* 12/2008 Parkinson ....................... 705/14

\* cited by examiner

*Primary Examiner* — Michael S McNally
(74) *Attorney, Agent, or Firm* — Lindauer Law, PLLC

(57) ABSTRACT

A single origin policy of a web browser includes an exception for images, such as markup language image files. Data may be encoded using the height and width dimensions, pixel colors or transparencies, or other parameters defining one or more images. Such images may be sent to device and accepted by the web browser, and decoded to construct the underlying data. A single origin policy may be circumvented during authenticated access sessions so that information from various sources may be received by a requesting device.

20 Claims, 9 Drawing Sheets

IMAGE SIZE COMMUNICATION

BACKGROUND

Respective users search for and access information, machine-executable files, and other website based content using web browsers running on various apparatus. However, security against viruses or other malicious code is of paramount concern. The security measures themselves sometimes hinder user access to information, and appropriate solutions are desirable which maintain security while allowing access.

Figure 1:
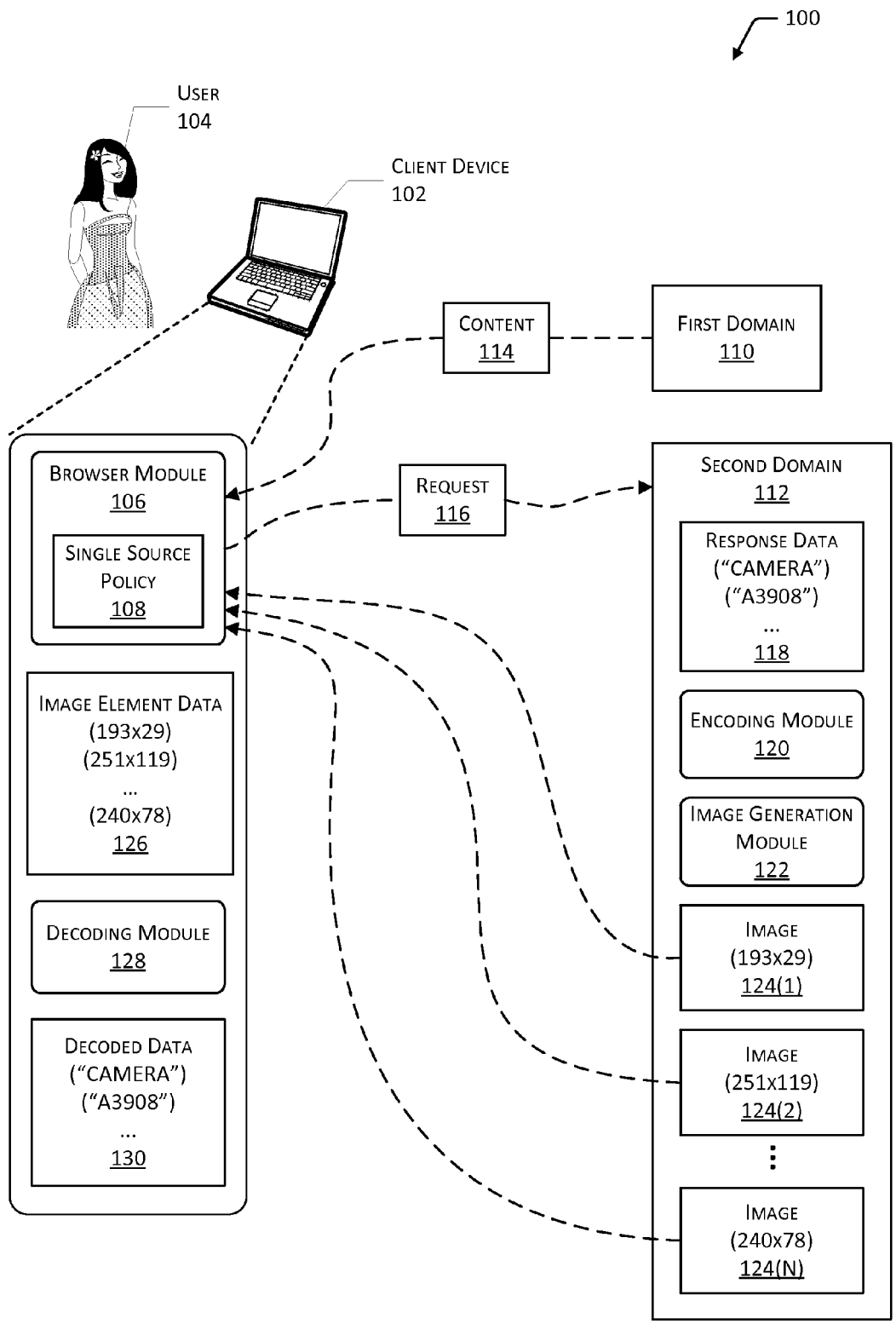
FIG. 1 is an illustrative system for providing data to a client device, in which the data is encoded using respective parameters of one or more image files.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

Web browsers enable users of various apparatus to access or exchange information, share and view digital photographs, acquire program code for various purposes, and so on. A typical web browser may be configured to issue general or specific requests for information, and accept data or executable code provided in response to such a request. The web browser may also be configured to process received data for storage or presentation to a user, provide received code to a processor for execution, and so on.

For example, a user may access a banking website using a web browser, while searching for information regarding personal finance. The website may include various information regarding savings accounts or investing, suggestions for securing favorable terms on a mortgage, and so forth. The website may also include a home-loan interest calculation program that may be downloaded to the user's device and run as executable code. If the banking website is an authenticated or otherwise trustworthy source, then such a calculation program is likely of a benign nature and may be of significant help to the user. In such a case, the user may download the calculation program using their web browser and allow the executable code to run with a significant measure of confidence. That is, content or program code received from a trusted or authenticated website likely raises few, if any, security concerns.

A common occurrence is the requesting and acquisition of data, information or other content from a plurality of websites or sources during an online session. Under such circumstances, a user may employ their web browser to seek information of a specific nature, and receive content from numerous websites, trustworthy or otherwise. In fact, a user may not even be aware of the particular websites that respond to a request, as an intentionally accessed web server may automatically contact another web server seeking content or portions thereof. Such an operation may be transparent to the user, and potentially risky with respect to malicious code that may be acquired from an unknown source and sent to the web browser.

Web browser design has advanced in response to the problems associated with malicious content. One added measure of security is the enforcement of a single source policy (or same source policy). Generally, a web browser under a single source policy will authenticate (i.e., establish as trustworthy) a particular website and thereafter accept content of various types from that website during a present online session. Conversely, such a web browser will reject numerous types of content—notably, executable files, scripts, and so forth—from other websites during the single-source online session. Thus, a "single source" is trusted, while others are not (or less so).

However, single source policies often make exceptions for image files, as these are not processed as executable code and are unlikely to be used to introduce viruses or other malicious content. Image files can include, for non-limiting example, digital photographs, computer-generated graphics, graphs, maps, tables, and so forth. Markup languages such as hypertext markup language (HTML), extensible markup language (XML), or others use respective established elements and syntax for defining images. Web browsers are configured to identify these elements and process them in predetermined ways. In short, a markup language image file has particular parameters that are recognized and treated as those of an image, and not as some other form of executable code, by the receiving web browser.

Therefore, data may be safely communicated from an unauthenticated website (source) to a web browser enforcing a single source policy if such data is encoded using respective markup language image elements. Such data may be requested, or a response or responses provided, by way of varying pathways. Additionally, specific filenames may be included in the request, as well as an indication that a response is to be encoded using one or more image parameters.

For example, a user may access a web server of an online merchant by way of the web browser running on the user's client device. The merchant web server is also referred to as a "first domain" for purposes of this example. The web browser may be running a single source policy that authenticates the first domain and therefore accepts most or all types of content from the first domain. Pursuant to the single source policy, the web browser will reject many types of content from websites or sources other than the first domain during the present, single-source session.

For purposes herein, a "domain" refers to one or more web servers or other computing devices configured so as to appear essentially as a single entity from a perspective outside of that domain. For example, a domain may include three web servers cooperating to provide content on a website (of one or several webpages) that is accessible by any number of client devices. Without limitation, the Internet may provide access to any number of different domains, each appearing as a distinct presence from the vantage point of a client device or its user.

Continuing the previous example, the user requests information regarding merchandise offered for sale through the first domain, such as personal digital media players. Corresponding information, photographic images, or other content are retrieved from storage at the first domain and provided to the web browser of the client device, where it is processed and presented to the user. The user, interested in warranty information for a particular audio player, clicks on a corresponding link as provided by the first domain. However, the manufacturer offering the warranty coverage does not provide the actual warranty content to the first domain—just the link for retrieving that information from another (unauthenticated) web server.

The web browser recognizes based on the link that the information source is a "second domain" for purposes of the present session. The web browser then sends a request to the second domain in response to the user actuation (clicking) of the warranty link. The request indicates that an acceptable response must be encoded using markup language image elements.

The second domain receives the request, and retrieves the corresponding warranty information. The second domain then encodes that information using one or more encoding schemes that are correlated to respective height and width dimensions for a number of images. For purposes of the present example, the warranty information is encoded using the height and width dimensions of a total of 77 respective image files. That is, the height and width dimensions of each image may be decoded to construct (i.e., extract) a respective portion of the warranty information.

The 77 images are then provided from the second domain to the web browser. The images may be communicated to the web browser using a variety of pathways. The web browser receives the respective images, parsing the height and width dimensions of each and providing them to a decoding module of the client device. The decoding module cross-references or otherwise determines the necessary decoding schemes using the height and width dimensions, and the actual warranty information is decoded (i.e., constructed, or assembled) for presentation to the user.

Other image elements such as file identifiers, pixel color identification values, file sizes, pixel transparency values, pixel red-green-blue values, or other parameters may also be used to encode data or information for reception in a single source context. In one example, images having only a single, predetermined color (e.g., each image is all blue) are used to encode data by way of their respective parameters. Such single-color images are handled and decoded accordingly, and all others images are treated as regular image files. Additionally, decoding modules may be configured to treat all such decodable image files as data, strings, or other sorts of information, and to decode no images as executable code, in further interest of security.

Thus, existing single source policies may be circumvented, when desired, without undue risk of exposure to malicious content and without need to modify existing web browsers. Thus, the techniques and resources described in this disclosure may be deployed or implemented immediately so that various kinds of information may be acquired during single source online sessions from one or more unauthenticated domains.

FIG. 1 depicts views of a system 100 for requesting data encoded using image parameters. The system 100 is illustrative and non-limiting in nature, and other systems inclusive of other elements or performing other particular operations may also be used. A client device 102 is depicted. While a single client device 102 is shown, it is understood that the system as described may support more than one client device. The client device 102 is depicted as a laptop computer associated with a user 104, for clarity. However, other client devices may include tablet computers, personal computers, electronic book readers, gaming consoles, smartphones, wearable computing devices, and so forth.

The client device 102 includes a browser module 106 (i.e., web browser). The browser module 106 is configured to access respective websites and to acquire or request data, information, images, and so forth in accordance with user 104 input. The browser module 106 may be configured to operate, at least some of the time, in accordance with a single source policy 108.

Also depicted is a first domain 110. The first domain 110 may include one or more web servers hosting (providing) any number of webpages, collectively defining a first website. Thus, the first domain 110 and the first website are interchangeable concepts from the perspective of the browser module 106. Further depicted is a second domain 112. The second domain 112 may include one or more web servers providing any number of webpages, such that a second website is defined. The second domain 112 and the second website are interchangeable concepts from the perspective of the browser module 106. The first domain 110 and the second domain 112 may be respectively configured to provide textual subject matter, program code, digital images, audio files, or other types of content to the client device 102.

For example, the user 104 may provide input to the client device 102, causing the browser module 106 to access a first domain 110. The browser module 106 may then authenticate the first domain 110 such that a trusted, single-source online session is established in accordance with the single source policy 108. Content 114 may be transmitted to the browser module 106 in response to a user 104 query for information, and so on. The browser module 106 accepts the content 114 in accordance with the single source policy 108.

For purposes of illustration, the first domain 110 is a web server for an online merchandise retailer, and the content 114 is information regarding the use of a particular digital camera having model number "A3908". The user 104 views the content 114 on the client device 102, and determines that more detail is required regarding certain camera operations. The user 104 then provides input directing the browser module 106 to download a user manual for the camera to the client device 102. The browser module 106 responds to the input by sending a request 116 to the second domain 112, which for illustration purposes is a web server for the manufacturer of the camera. The browser module 106 directs the request 116 to the second domain 112 using a corresponding universal resource locator (URL) included in the content 114.

The request 116 may include a particular file name or other identifier for the user manual, as well as some indication that a response is to be encoded using image parameter-based encoding. For instance, the request 116 may indicate that a single source policy is presently in effect with another domain. Other sorts of indicators may also be used. The second domain 112 is configured to recognize the specific subject matter of the request 116, as well as the need to encode a response by way of image parameters, such as markup language image elements.

The second domain 112 retrieves the camera user manual information from storage, depicted as response data 118. The second domain 112 also includes an encoding module 120. The encoding module 120 may be configured to use the response data 118 to generate or derive respective values or parameters that may be encoded using markup language image elements. The encoding module 120 may include electronic circuitry, computer-readable storage media including data structures or program code, or any other suitable constituency.

The encoding module 120 parses the response data 118 as one or more respective portions, and encodes each portion using the height and width dimensions (elements) of a respective markup language image file. The encoding module 120 passes the respective height and width dimensions, which may be referred to as dimensional pairs, to an image generation module 122. As depicted, the response data 118 has been encoded as a plurality of "N" dimensional pairs, and these have been passed to the image generation module 122.

The image generation module 122 may be configured to receive respective parametric values from the encoding module 120 and to use these values to define one or more markup language images (or image files). The image generation module 122 may include electronic circuitry, computer-readable storage media including data structures or program code, or any other suitable constituency.

Continuing the present example, the image generation module 122 generates a total of "N" images 124(1), 124(2) . . . 124(N) using the height and width dimensional pairs provided by the encoding module 120. For instance, the image 124(1) is defined by a height of 193 pixels and a width of 29 pixels, and so on. The second domain 112 then provides the respective images (i.e., media files, or image files) 124(1)-124(N) to the browser module 106, where they are received and accepted as markup language images in accordance with the single source policy 108.

The browser module 106 processes the images 124 so as to identify and parse the image elements such that the respective dimensional pairs collectively define image element data 126. The image element data 126 is passed from the browser module 106 to a decoding module 128. The decoding module 128 may be configured to identify or determine one or more respective decoding schemes, or specific decoded values or strings, using markup language image parameters provided by the browser module 106. The decoding module 128 may include electronic circuitry, computer-readable storage media including data structures or program code, or any other suitable elements or resources.

The decoding module 128 uses the respective dimensional values (e.g., 193×29) of the image element data 126 to identify (i.e., associate, or correlate) a respective decoding scheme for each of the images 124. Such association may be performed by: cross-referencing decoding schemes, strings, or values within a data structure; by using the dimensional values as arguments within one or more mathematical operations; or by another suitable technique.

The decoding module 128 uses the associated decoding schemes to construct the camera user manual as decoded data 130. Thus, the images 124 are processed so that the height and width dimensions of each are used to derive respective portions—and collectively, the entirety—of the camera user manual requested by the user 104.

In the example just described above, only the height and width dimensional values are used to construct the underlying information. Thus, the decoding module 128 may be further configured to ignore other elements or parameters of the images 124 such as the respective pixel colors, image file sizes in bytes, and so forth. However, it is contemplated herein that these or other markup language image elements may also be used in other respective information encoding and decoding schemes.

It is further contemplated that other media file types besides images may be used to convey data past a single origin policy 108. For example, an audio file may be defined by respective encoding characteristics that are associated with respective encoding schemes. Other media file types and their respective parameters or characteristics may also be used.

Figure 2:
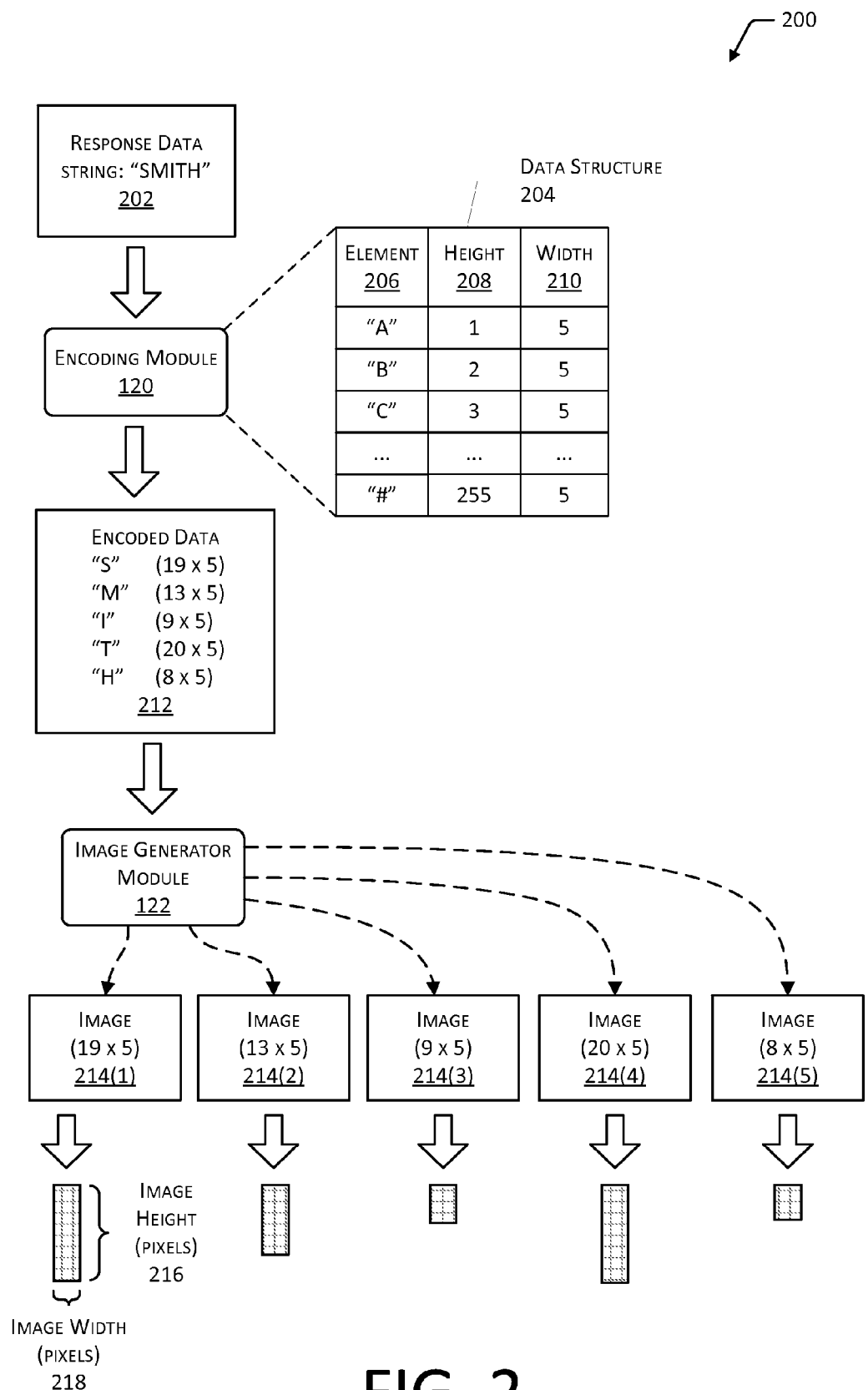
FIG. 2 illustrates resources and a sequence of operations for encoding data using image height and width parameters.

FIG. 2 depicts views 200 of resources and a sequence of operations in an information encoding scheme. The views 200 are illustrative and non-limiting in nature, and any number of other examples in accordance with the methods and resources described herein may be defined and used.

Depicted is response data 202 including the alphabetic string "SMITH". The response data 202 is illustrative and relatively simple in the interest of clarity. However, other data or information of generally unlimited nature or quantity may be encoded using image file parameters according to the processes and resources described herein. For purposes of illustration, the response data 202 has been retrieved in accordance with a customer identification number provided in a request 116, and is passed to the encoding module 120.

The encoding module 120 includes a data structure 204. The data structure 204 includes a data element 206 column of respective characters arranged one per row. As depicted, the first row of the data structure 204 includes the letter "A", the second row the letter "B", and so on. For purposes of illustration, the data structure 204 is understood to include a total of 255 characters, each associated with a respective encoding scheme. Other data structures having other counts or specific elements may also be used.

The data structure 204 also includes a height 208 column including respective image height dimensions in units of pixels associated with the respective characters of the data element 206 column. The data structure 204 also includes a width 210 column including image width dimensions in units of pixels associated with the respective characters. For example, the first row of the data structure 204 cites the letter "A", which is associated with an image height dimension of 1 pixel, and a width dimension of 5 pixels.

Notably, the illustrative data structure 204 includes the same width dimension of 5 pixels for each character. That is, each of the characters "A", "B", and so on, may be encoded as individual markup language images wherein the widths 210 are uniform throughout the entire character set. A decoding module (e.g., 128) may, for instance, be configured to interpret only those images of width 5 pixels as being encoded data and process them accordingly.

The relatively simple encoding scheme depicted by the data structure 204 is directed to non-limiting illustration and clarity, and more complex or comprehensive encoding schemes are contemplated. For example, an encoding scheme may be defined wherein entire words of a predefined lexicon correspond to respective height and width dimensional pairs. In yet another example, respective pixel colors are used to encode an alphanumeric character (or string) and each of the corresponding images is of fixed height and width dimensions (e.g., 10×10). Other encoding schemes using respective markup language image elements may also be used.

The encoding module 120 uses the data structure 204 to encode the five respective letters of the response data 202 "SMITH". Each of the letters is cross-referenced by the encoding module 120 to a correlated height and width value set (or pair). The letter "S" correlates to a height of 19 pixels, and a width of 5 pixels. The letter "M" correlates to a height of 13 pixels and a width of 5 pixels, and so forth. The five particular height pairs collectively define encoded data 212.

The encoding module 120 passes the encoded data 212 to the image generation module 122. The image generation module 122 then generates five respective images, or image files, 214(1)-214(5). Each of the images 214 is encoded in accordance with a markup language element standard, such as (without limitation) HTML. For instance, the image 214(1) encodes the letter "S" by way of an image height 216 of 19 pixels, and an image width 218 of 5 pixels.

The four images 214(2)-214(5) encode the letters "M", "I", "T" and "H", respectively, by way of their individual parameters. The images 214 may be provided to the client device 102, accepted under an exception within the single source policy 108, and processed to decode the original response data 202 "SMITH".

In another example, data is encoded using respective images having content in accordance with a common theme or subject matter: flags, birds, flowers, electronic device symbols, polygons, and so forth. The actual data may be encoded using the height and width dimensions, a boarder dimension or color, or other seemingly incidental parameters of each image. Use of a common theme may mislead an unauthorized party that intercepts or acquires such images and then attempts to interpret their meaning or significance. Thus, if such common-theme images appear to have special meaning in their visually presented contents—which they do not—the actual encoded information (by way of the parameters) may be further safeguarded.

Figure 3:
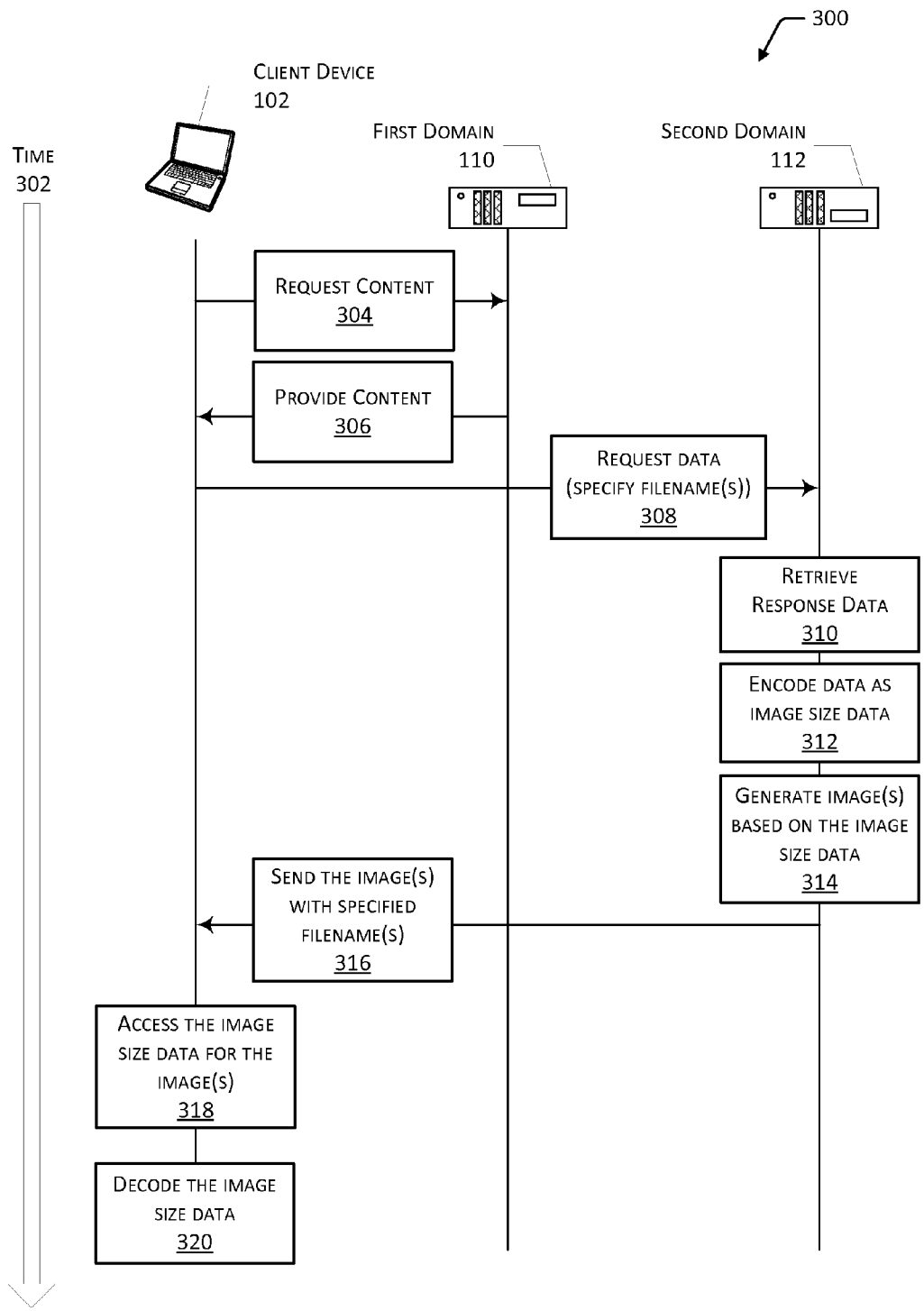
FIG. 3 illustrates an exchange of data between respective devices, including a provision of data using encoded images.

FIG. 3 is a flow diagram 300 of an exchange of data between the devices of the system 100. In this illustration, time increases down the page as indicated by arrow 302. For purposes of illustration, the client device 102 has established an authenticated, single-source session with the first domain 110. Thus, the browser module 106 of the client device 102 is operating in accordance with the single source policy 108.

At 304, the client device 102 sends a request for content 114 to the first domain 110. For example, the user 104 of the client device 102 may be seeking information about merchandise for sale by the first domain 110, an e-commerce retailer. The client device 102 responds to input from the user 104 by sending a request 116 to the first domain 110.

At 306, the first domain 110 provides content 114 to the client device 102 in response to the request for content 304. In the present example, the content 114 may include digital photographs, descriptive text, audio narration, or other data pertaining to imported articles of clothing. The content 114 is received by the client device 102 and accepted in its entirety in accordance with the single source policy 108. Thus, the user 104 may view the digital photographs, read the descriptive text, and so on.

At 308, the client device 102 sends a request 116 for data to the second domain 112. The request 116 includes one or more specific filenames, and an indication that a single source policy 108 is in effect. In the present example, the user 104 seeks information regarding a returns and exchanges policy for an article of clothing presented by the content 114. Such returns and exchanges are handled by the second domain 112, which is a customer service affiliate of the e-commerce retailer. In turn, a URL and a specific filename for the corresponding information are provided by the content 114.

At 310, the second domain 112 retrieves response data 118 in accordance with the request 116. In particular, information under the specific filename is retrieved from storage or other resources, defining response data 118. Thus, the response data 118 includes the returns and exchanges policy as sought after by the user 104.

At 312, the response data 118 is encoded as image size data. In the present example, the response data 118 is encoded by an encoding module 120 of the second domain 112. Such encoding may use one or more encoding schemes, make use of a data structure (e.g., 204), and so on. The encoding module 120 processes the response data 118, or portions thereof, such that height and width values defining one or more dimensional pairs are derived. The resulting dimensional pairs collectively define image size data (analogous to encoded data 212).

At 314, images based on the image size data are generated. In the present example, the image generation module 122 uses the image size data to generate one or more images 124. Each of the images 124 is respectively encoded using markup language image elements including height and width dimensions. Thus, the height and width dimensions of the one or more images 124 corresponds to a portion (or the entirety, in the case of one image 124) of the data 118. Also, each of the one or more images 124 includes the filename as specified in the request 116 for identification by the client device 102.

At 316, the one or more images 124 are provided from the second domain 112 to the client device 102. The browser module 106 receives and accepts the images 124 as exceptions to the single source policy 108.

At 318, image size data for the images 124 is accessed. In the present example, the browser module 106 accesses, or parses, the respective markup language image elements of the images 124 such that the height and width dimensions are identified. The one or more identified dimensional pairs define image element data 126.

At 320, the image element data 126 is decoded. In the present example, the decoding module 128 of the client device 102 receives the image element data 126 and uses it to identify one or more decoding schemes. For instance, the decoding module 128 may use the height and width dimensions of the image element data 126 to cross-reference predefined strings or values within a data structure (e.g., 204) or lookup table. The decoding module 128 uses the identified decoding schemes, or correlated values, to construct the decoded data 130—namely, the returns and exchanges policy. The decoded data 130 (i.e., the returns and exchanges information) may now be presented to the user 104 of the client device 102.

Figure 4:
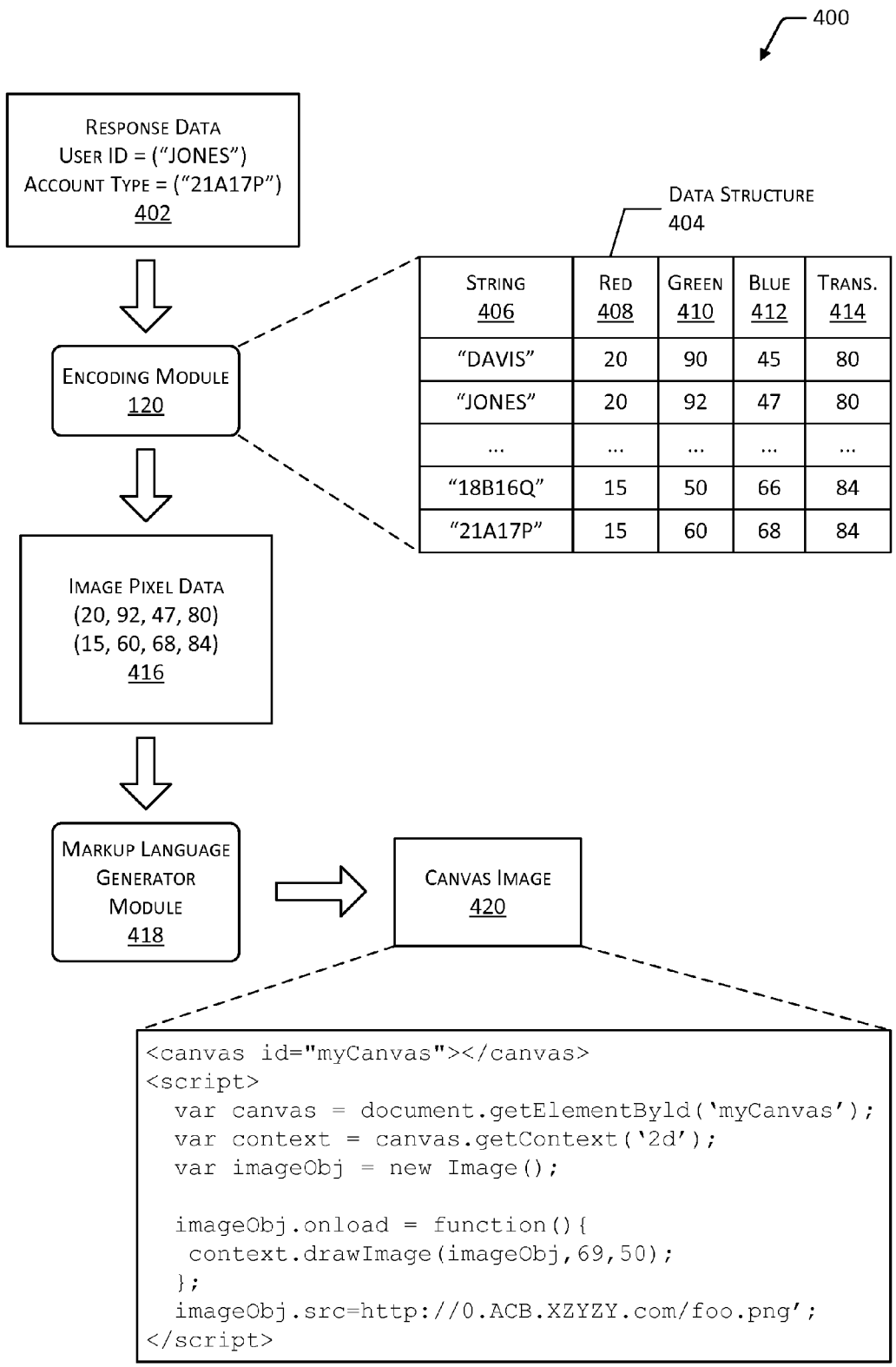
FIG. 4 illustrates resources and a sequence of operations for encoding data using pixel color and transparency values.

FIG. 4 depicts views 400 of resources and parameters used in another information encoding scheme. The views 400 are illustrative and non-limiting in nature, and any number of other examples in accordance with the methods and resources described herein may be defined and used.

Response data 402 includes two respective elements: a User ID of "JONES"; and an Account Type value or code of "21A17P". For purposes of non-limiting example, the two respective elements of the response data 402 are recorded within a customer database (or data structure) for an e-commerce merchant defining a second domain 112. Further to the example, the user 104 has sent a request for the two elements of response data 402, which must be encoded using image parameters due to the single source policy 108 that is in effect. The data 402 is gathered from corresponding storage and passed to the encoding module 120.

The encoding module 120 receives the response data 402 and cross-references each element against predefined pixel parameter values within a data structure 404. The data structure 404 includes respective rows (or records) each corresponding to individual data elements within the customer database of the second domain 112. The data structure 402 includes a string 406 column having respective strings or values of the database elements. The data structure 404 also includes a red 408 column, a green 410 column, and a blue 412 column, each citing respective values of intensity. The data structure 404 also includes a transparency 414 column, with respective numerical transparency values. Each of the string 406 elements therefore corresponds to a pixel defined by respective values in the columns 408-414. For example, a User ID "DAVIS" is associated with a pixel of red 408 intensity value of 20, green 410 intensity value of 90, blue 412 intensity value of 45, and transparency value of 80. In turn, an Account Type "18B16Q" is associated with a pixel of red 408 intensity value of 15, green 410 intensity value of 50, blue 412 intensity value of 66, and transparency value of 84. Thus, each string 406 element may be encoded using respective parameter values 408-414 for a single pixel within a canvas image 420. From a different perspective, each row of the data structure 404 represents a database value associated with a respective encoding scheme.

Returning to the present example, the encoding module 120 uses the data structure 404 to encode the two elements of the response data 402 using image pixel data 416. Thus, "JONES" is encoded as pixel color and transparency values (20, 92, 47, 80), and "21A17P" is encoded as pixel color and transparency values (15, 60, 68, 84).

The image pixel data 416 is passed from the encoding module 120 to a markup language generator module 418. In one implementation, the image generation module 122 is equivalent to, or configured to include the functionality of, the markup language generator module 418. The markup language generator module 418 is configured to generate HTML5 canvas images including the respective data elements encoded by the image pixel data 416. In the present example, the markup language generator module 418 generates a canvas image 420. Pixels of the canvas image 420 encode the values "JONES" and "21A17P", respectively.

Additionally, the id parameter of the canvas image 420 includes data "myCanvas", and cites to a particular image "foo.png" located at a uniform resource locator (URL) address in hypertext protocol. Therefore, the canvas image 420 includes data identification information, and image names and their locations. The canvas image 420 may now be provided to the user 104 by way of the client device 102 for processing and decoding, thus reconstructing the requested data elements.

Figure 5:
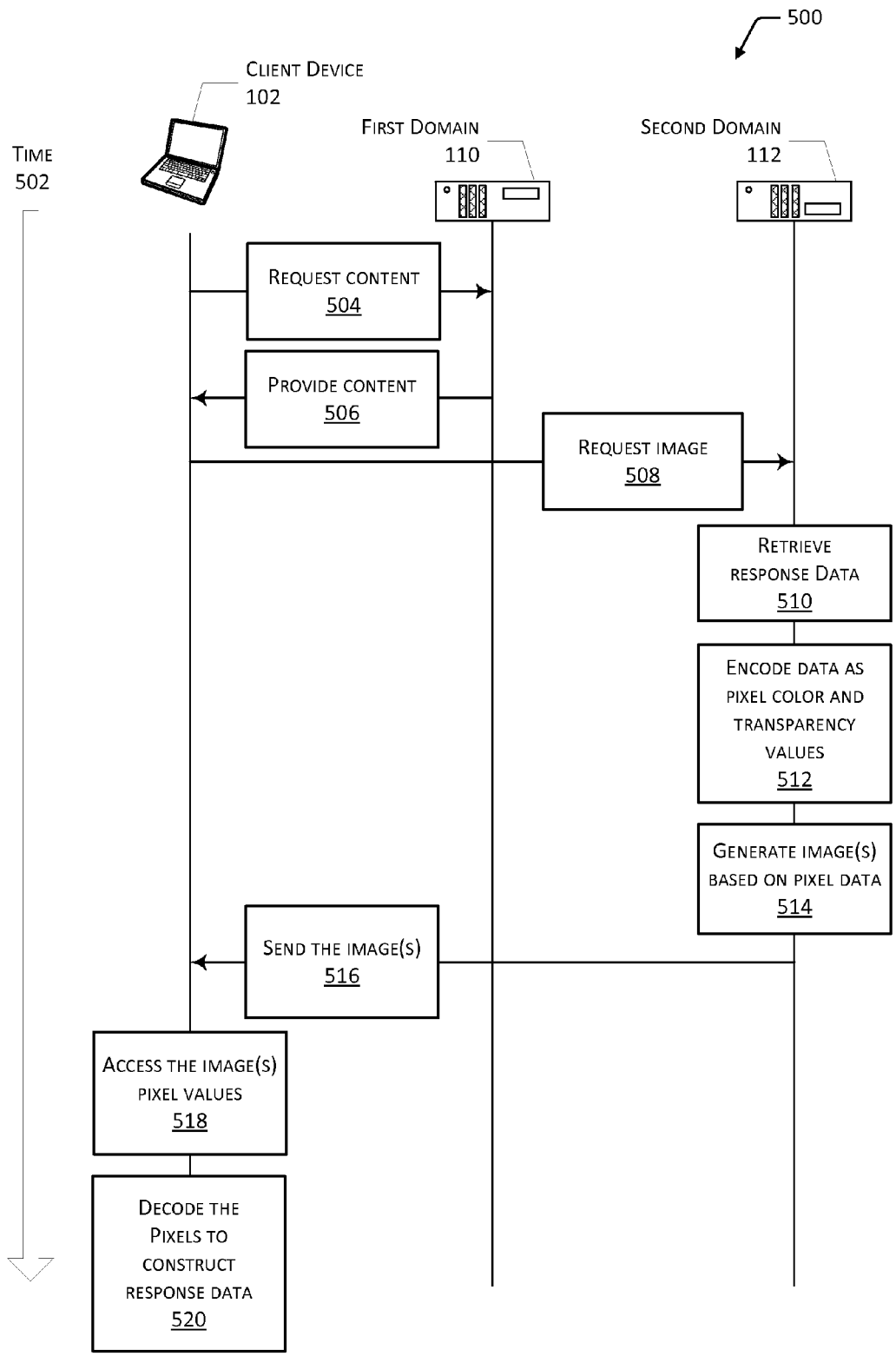
FIG. 5 illustrates an exchange of data between respective devices, including the provision of data using canvas images.

FIG. 5 is an alternative flow diagram 500 of an exchange of data between the devices of the system 100. In this illustration, time increases down the page as indicated by arrow 502. For purposes of illustration, the client device 102 has established an authenticated, single-source access session with the first domain 110. Thus, the browser module 106 of the client device 102 is operating in accordance with the single source policy 108.

At 504, the client device 102 sends a request for content to the first domain 110. For example, the user 104 of the client device 102 may be seeking information about existing accounts and accounting practices from the first domain 110, an e-commerce merchant having Internet accessibility. The client device 102 responds to input from the user 104 by sending a request to the first domain 110. The user 104 is understood to be an authorized auditing entity and is therefore privy to accounting information maintained by the first domain 110.

At 506, the first domain 110 provides content 114 to the client device 102 in response to the request for content. In the present example, the content 114 may include descriptive text, graphs, or tables of accounting-related data, or other corresponding information. The content 114 also provides one or more canvas tags so as to allow providing a response using canvas images 420, as well as citations "userid" and "accounttype" for particular information sought by the user 104. The content 114 is received by the client device 102 and accepted in its entirety in accordance with the single source policy 108. Thus, the user 104 may view the graphs or tables, read the descriptive text, and so on.

At 508, the client device 102 sends a request 116 for an image to the second domain 112. In the present example, the request 116 names a particular image 420, such as "foo.png", as well as the specific citations included with the content 114—namely, "userid" and "accounttype".

The request 116 also includes the one or more canvas tags sent with the content 114. Specific account information is stored and provided by the second domain 112, which is an affiliate of the e-commerce merchant.

At 510, the second domain 112 retrieves response data 402 in accordance with the request 116. In particular, the requested customer name "JONES" (i.e., "userid") and their account specification "21A17P" (i.e., "accounttype") are retrieved from storage or other resources, defining response data 402.

At 512, the response data 402 is encoded as pixel color and transparency values. In the present example, the response data 402 is encoded by an encoding module 120 of the second domain 112. In the present example, the encoding makes use of the data structure 404. Other encoding resources or processes may also be used. The encoding module 120 processes the response data 402 deriving respective pixel color (red-green-blue) and transparency values. The resulting pixel parameter values collectively define image pixel data 416. Additionally, a particular image named "foo.png" is retrieved from the cited URL address, in accordance with the canvas tags provided with the content 114.

At 514, one or more images 420 based on the image pixel data 416 are generated. In the present example, the image generation module 122 is configured to encode data using HTML5 canvas images 420. Thus, the image generation module 122 uses the canvas tags, the image "foo.png", and the image pixel data 416 to generate a canvas image 420. Also, the canvas image 420 includes the data image name "foo.png" as specified in the request 116.

At 516, the canvas image 420 is provided from the second domain 112 to the client device 102. The browser module 106 receives the canvas image 420 as exceptions to the single source policy 108.

At 518, the canvas image 420 pixel values are accessed. In the present example, the browser module 106 accesses, or parses, the respective pixel values of the canvas image 420. Thus, the specific red 408, green 410, blue 412, and transparency 414 values for each of the two pixels are identified and parsed as respective data elements or sets. Also, the canvas image 420 is identified as conveying customer name and account specification, respectively.

At 520, the canvas images 420 are decoded. In the present example, the decoding module 128 of the client device 102 receives the canvas image 420 pixel values and uses them to identify respective decoding schemes. For instance, the decoding module 128 may use the (reconstructed) image pixel data 416 to cross-reference predefined values within a data structure equivalent or analogous to the data structure 404. The decoding module 128 uses the correlated pixel color and transparency values to construct the customer name "JONES" and their account specification "21A17P". The decoded customer information (e.g., response data 402) may now be presented to the user 104 of the client device 102.

The process of the diagram 500 depicts one illustrative way in which data of a sensitive nature may be encoded using image parameters in accordance with a predefined data structure 404 of particular strings or values. Thus, two goals may be served —circumventing a single source policy (e.g., 108), and securing communication of sensitive information. Without the possession of, or access to, the particular data structure 404, the canvas images 420 would be rendered as mere images, likely of irrelevant appearance or content.

For instance, the user 104 or another authorized party may acquire the data structure 404 during an authenticated access session between the client device 102 and the second domain 112. Under such circumstances, the second domain 112 would be dealt with as a trusted source. Thereafter, the data structure 404 may be used without need to re-establish an authenticated session with the second domain 112 (or another data source). Furthermore, periodic or occasional authenticated access between the client device 102 and the second domain 112 would allow for synchronizing or updating the data structure 404, as needed.

In the previous example, a single data structure 404 was used to encode and decode data that passed through a single origin policy 108. That is, a single data structure 404 was used to define pixel values for each data element (e.g., customer name and account specification) that was encoded in a single image (e.g., foo.png). In another instance, multiple data structures may be used for encoding and decoding, thus allowing even greater information density. For example, each pixel in an image may correspond to a respective data structure based on pixel location or "number" within the image. Thus, an image made up of 90 pixels may be encoded and decoded using 90 respective data structures (or lookup tables). Other data structure-to-pixel correspondences may also be used.

Figure 6:
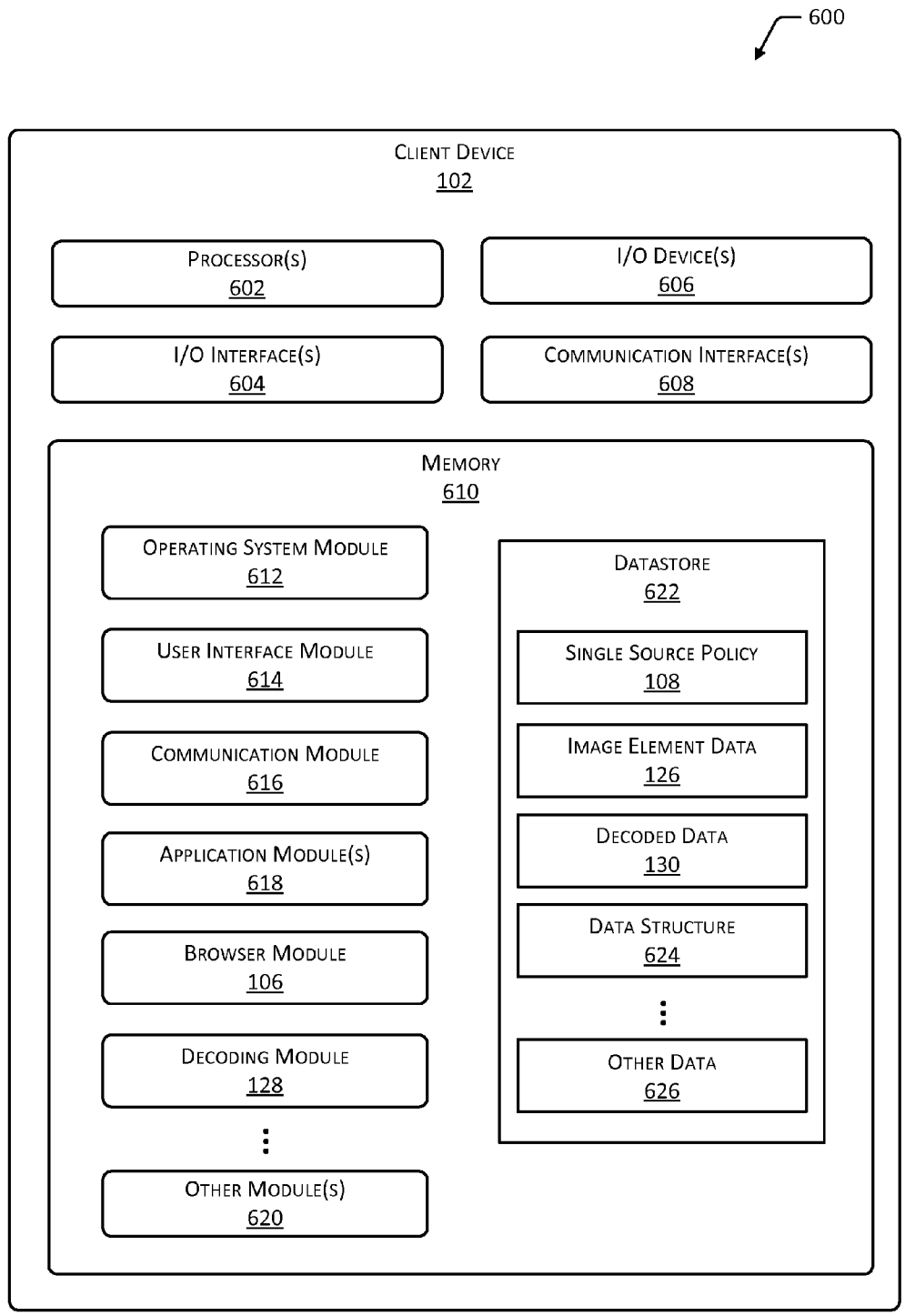
FIG. 6 illustrates a block diagram of an illustrative client device configured to receive and decode data from images under an exception to a single origin policy.

FIG. 6 illustrates a block diagram 600 of the client device 102 which may be configured to request information or data, receive data encoded using respective image elements, and construct the underlying data from the image elements. The client device 102 may include one or more processors 602 configured to execute one or more stored instructions. The processors 602 may comprise one or more cores.

The client device 102 may include one or more input/output ("I/O") interface(s) 604 to allow the processor 602 or other portions of the client device 102 to communicate with other devices. The I/O interfaces 604 may comprise inter-integrated circuit ("I2C"), serial peripheral interface bus ("SPI"), Universal Serial Bus ("USB") as promulgated by the USB Implementers Forum, RS-232, one or more device interfaces such as High Definition Multimedia Interface ("HDMI") as promulgated by HDMI Licensing LLC, and so forth.

The I/O interface(s) 604 may couple to one or more I/O devices 606. The I/O devices 606 may include input devices such as one or more of a camera, a microphone, a touch sensor, a button, a mouse, a keyboard, and so forth. The I/O devices 606 may also include output devices such as one or more of a display, audio speakers, haptic output devices, and so forth. The display may comprise an electrophoretic display, projector, liquid crystal display, interferometric display, light emitting diode display, and so forth. In some embodiments, the I/O devices 606 may be physically incorporated with the client device 102 or may be externally placed.

The client device 102 may also include one or more communication interfaces 608. The communication interfaces 608 are configured to provide communications with the client device 102, the first domain 110, the second domain 112, other web servers, routers, access points, and so forth. The communication interfaces 608 may include devices configured to couple to one or more networks including PANs, LANs, WLANs, WANs, WWANs, and so forth.

The client device 102 may also include one or more busses or other internal communications hardware or software that allow for the transfer of data or other signals between the various modules and components of the client device 102.

As shown in FIG. 6, the client device 102 includes one or more memories 610. The memory 610 comprises one or more computer-readable storage media ("CRSM"). The CRSM may be any one or more of an electronic storage medium, a magnetic storage medium, an optical storage medium, a quantum storage medium, a mechanical computer storage medium, and so forth. The memory 610 provides storage of computer readable instructions, data structures, program modules, and other data for operation of the client device 102.

The memory 610 may include at least one operating system ("OS") module 612. The OS module 612 is configured to manage hardware resource devices such as the I/O interfaces 604, the I/O devices 606, the communication interfaces 608, and provide various services to applications or modules executing on the processors 602. Also stored in the memory 610 may be one or more of the following modules. These modules may be executed as foreground applications, background tasks, daemons, and so forth.

A user interface module 614 is configured to provide one or more user interface elements to the user 104 with the I/O devices 606 and to accept inputs received from the I/O devices 606. The user interface may include one or more visual, audible, or haptic elements. For example, the user interface may be configured to provide a graphic user interface, an audible user interface, and so forth. The user interface may be configured to present the decoded data (e.g., 130, 402, and so on) to the user 104 using the I/O devices 606.

A communication module 616 is configured to support communication between the client device 102 and the first domain 110, the second domain 112, other web servers or client devices, and so forth. One or more application modules 618 may include one or more of eBook readers, calculators, word processors, spreadsheets, slideshow presenters, drawing programs, and so forth.

The browser module 106 and the decoding module 128, as respectively described above, may also be included in the memory 610. Other modules 620 may also be present. For example, a digital rights management module may provide support for presenting or processing content protected using one or more digital rights management schemes.

The memory 610 may also include a datastore 622 to store information. The datastore 622 may use a flat file, database, linked list, tree, executable code, or other data structure to store the information. In some implementations, the datastore 622 or a portion of the datastore 622 may be distributed across one or more other devices including servers, network attached storage devices, and so forth.

As depicted here, the datastore 622 may store the single source policy 108, the image element data 126, the decoded data 130, a data structure 624 collectively including any or all of the data structure 204 or the data structure 404, and so forth. Other data 626 may also be stored. For example, the other data 626 may include user preferences, configuration files, and so forth.

Figure 7:
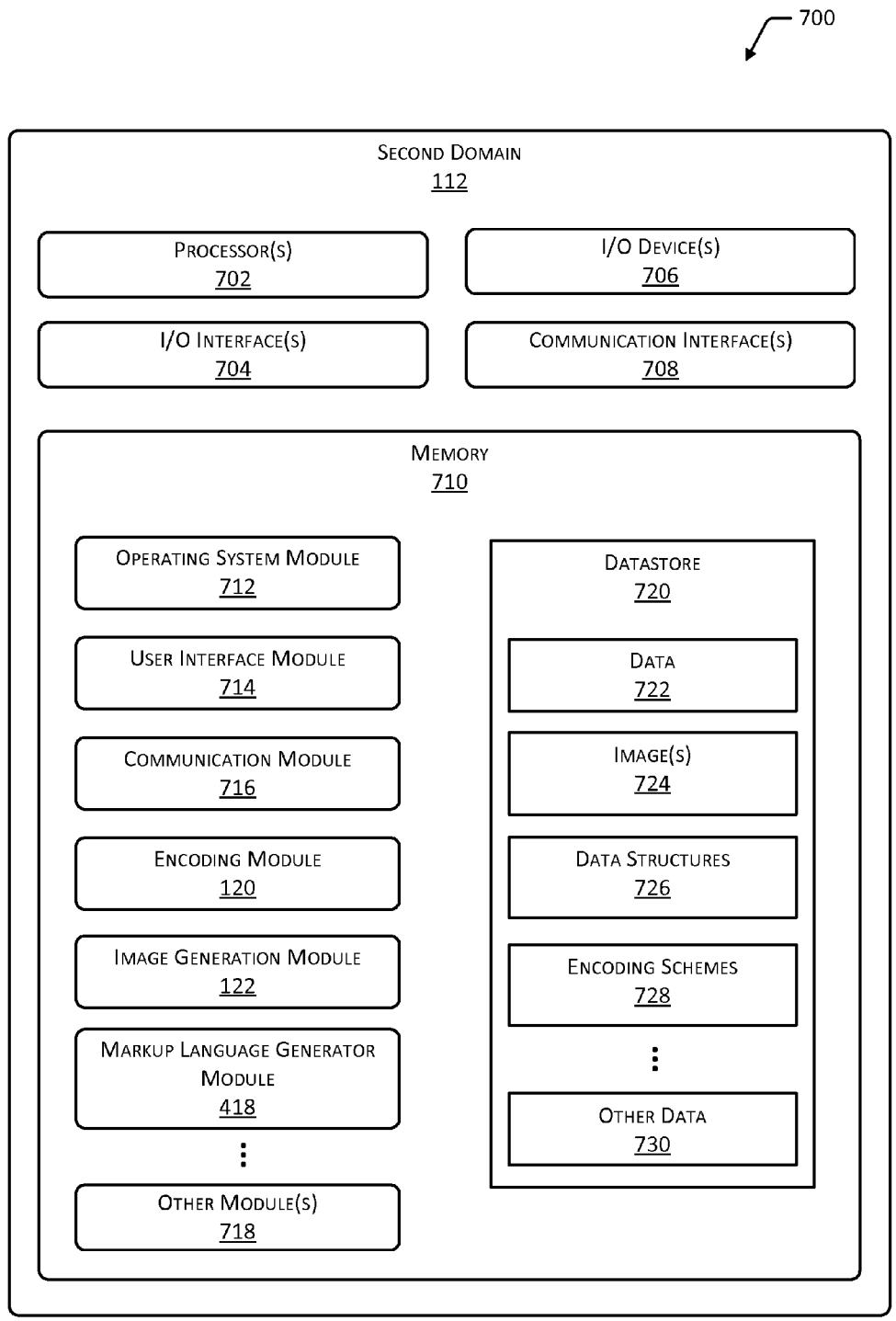
FIG. 7 illustrates a block diagram of a second domain configured to encode data using respective image parameters.

FIG. 7 illustrates a block diagram 700 of the second domain 112. The second domain 112 is depicted as a web server in the interest of illustration and clarity. However the second domain 112 may be implemented as one or more servers or other devices having respective resources and configuration in accordance with the matter presented herein.

The second domain 112 may include one or more processors 702 configured to execute one or more stored instructions. The processors 702 may comprise one or more cores. The second domain 112 may include one or more I/O interface(s) 704 to allow the processor 702 or other portions of the second domain 112 to communicate with other devices. The I/O interfaces 704 may comprise I2C, SPI, USB, RS-232, and so forth.

The I/O interface(s) 704 may couple to one or more I/O devices 706. The I/O devices 706 may include input devices such as one or more of a keyboard, mouse, and so forth. The I/O devices 706 may also include output devices such as indicator lights, a display for use by administrative or maintenance personnel, a printer, and so forth. In some embodiments, the I/O devices 706 may be physically incorporated with the second domain 112 or may be externally placed.

The second domain 112 may also include one or more communication interfaces 708. The communication interfaces 708 are configured to provide communications with the client device 102, the first domain 110, routers, access points, other servers, and so forth. The communication interfaces 708 may include devices configured to couple to one or more networks including PANs, LANs, WLANs, WANs, WWANs, and so forth.

The second domain 112 may also include one or more busses or other internal communications hardware or software that allow for the transfer of data between the various modules and components of the second domain 112.

As shown in FIG. 7, the second domain 112 includes one or more memories 710. The memory 710 comprises one or more CRSM. The memory 710 provides storage of computer readable instructions, data structures, program modules and other data for the operation of the second domain 112.

The memory 710 may include at least one OS module 712. The OS module 712 is configured to manage hardware resource devices such as the I/O interfaces 704, the I/O devices 706, the communication interfaces 708, and provide various services to applications or modules executing on the processors 702. Also stored in the memory 710 may be one or more of the following modules. These modules may be executed as foreground applications, background tasks, daemons, and so forth.

A user interface module 714 may be configured to provide one or more application programming interfaces, web interfaces, and so forth. The user interface module 714 is configured to accept inputs and send outputs using the I/O interfaces 704, the communication interfaces 708, or both.

A communication module 716 is configured to support communication with the client device 102, the first domain 110, and so forth. In some implementations the communication module 716 may support encrypted communications. For example, hypertext transport protocol secured ("HTTPS") or transport layer security ("TLS") may be supported.

The memory 710 may also include the encoding module 120, the image generation module 122, or the markup language generator module 418 as respectively described above. Other modules 718 may also be present. In one implementation, one of the other modules 718 may be an authentication module which cooperates with the communication module 716 when establishing an authenticated (i.e., single source) access session with the client device 102.

The memory 710 may also include a datastore 720 to store information. The datastore 720 may use a flat file, database, linked list, tree, executable code, or other data structure to store the information. In some implementations, the datastore 720 or a portion of the datastore 720 may be distributed across one or more other devices including servers, network attached storage devices, and so forth.

As depicted here, the datastore 720 may store data 722 collectively including any or all of the response data 118, the response data 202, the response data 402, and so forth. The datastore 720 may also store images 724 collectively including any or all of the images 124, the images 214, the canvas image 420, and so forth. The datastore 720 may further store data structures 726 collectively including any or all of the data structure 204, the data structure 404, and so on. The datastore 720 may also include one or more encoding schemes 728 configured to encode data or information by way of respective image parameters using mathematical operations or other encoding techniques.

Other data 730 may also be stored. For example, the other data 730 may include information used to detect a single source policy (e.g., 108) in effect when communicating with the client device 102, and so forth.

Figure 8:
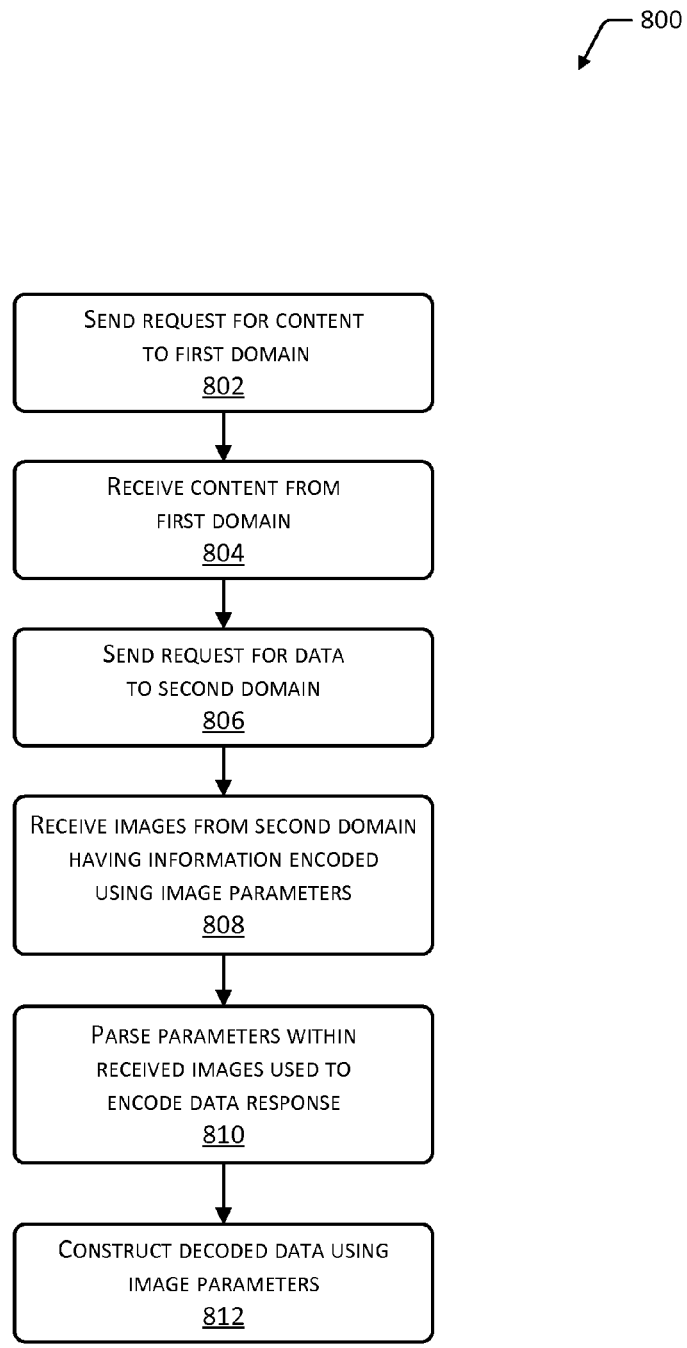
FIG. 8 is a flow diagram of a process for receiving and decoding data from the perspective of a client device.

FIG. 8 is a flow diagram 800 of a process wherein requests are issued from and responses are received by the client device 102. This process may also be implemented using other respective servers, client devices, systems, or configurations.

Block 802 sends a request for content to the first domain. For purposes of an illustrative example, the browser module 106 of the client device 102 accesses the first domain 110 and establishes a single source session therewith. The browser 106 also issues a request for information regarding a jewelry item offered for sale through the first domain 110.

Block 804 receives content from the first domain. In the present example, the first domain 110 sends content 114 to the browser module 106 in response to the request. The content 114 includes information regarding the jewelry item. The content 114 may also include links to other information such different gemstone options for inclusion in the jewelry item.

Block 806 sends a request for data to the second domain. In the present example, the user 104 clicks on one of the links included in the content 114. The browser module 106 responds by sending the request 116 to the second domain 112, asking for additional information regarding an option for including an emerald set in the jewelry item. The request 116 includes an indication that the single source policy 108 is in effect, and that a response should thus be encoded using image parameters.

Block 808 receives images from the second domain. In the present example, the browser module 106 receives a plurality of images (e.g., 124) encoded using established markup language elements and syntax.

Block 810 parses parameters within the received images used to encode the data response. In the present example, each of the images 124 received by the browser module 106 is characterized by height and width dimensions. The browser module 106 identifies these respective dimensional elements and passes them to the decoding module 128 as data (analogous to the image element data 126).

Block 812 constructs decoded data 130 using the image parameters. In the present example, the decoding module 128 uses the dimensional element data to cross-reference respective alphabetic, numeric, or other characters within the data structure 204 (or another analogous data structure). Using these characters, information regarding the emerald gemstone option is reconstructed, and may be presented to the user 104 of the client device 102.

Figure 9:
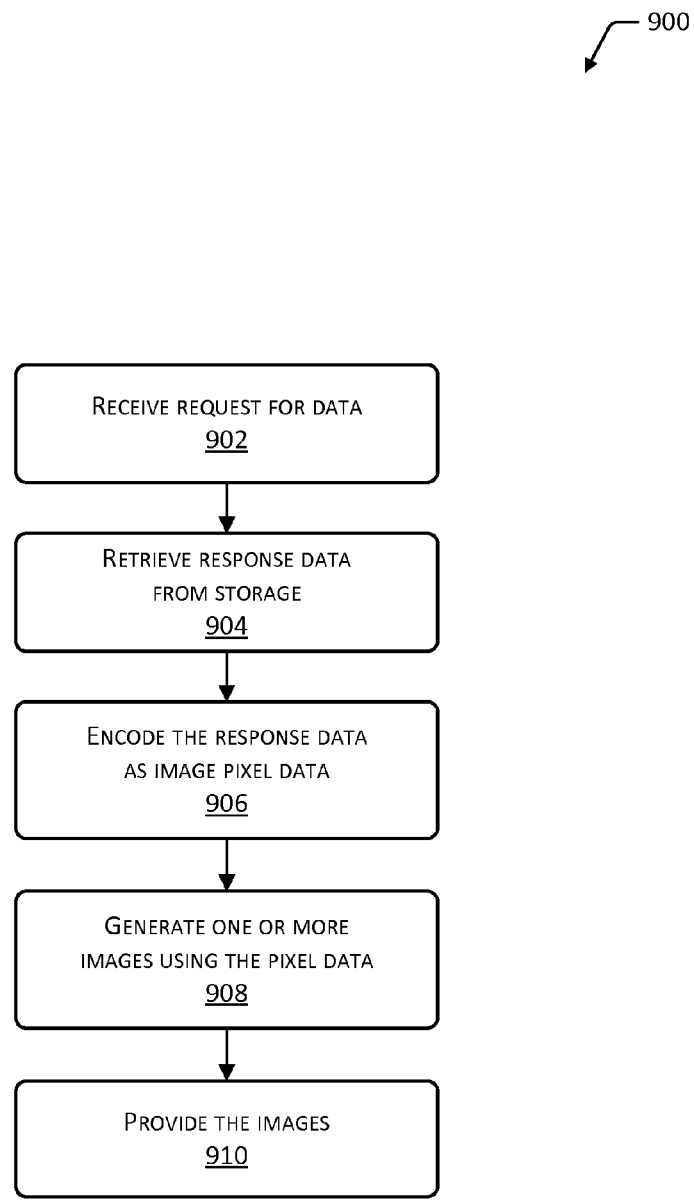
FIG. 9 is a flow diagram of a process for generating images having encoded data using pixel color and transparency values.

FIG. 9 is a flow diagram 900 of a process wherein requests received by and responses sent from the second domain 112. This process may also be implemented using other respective servers, client devices 102, systems, or configurations.

Block 902 receives a request for data. In a non-limiting example, the second domain 112 receives a request 116 for data from the browser module 106 of the client device 102. The request 116 includes an identifier number for a particular customer name sought after by the user 104, and an indication that a response is to be encoded using markup language image elements. The request 116 also includes one or more canvas tags (or canvas image tags) for use in encoding a response to the request 116.

Block 904 retrieves response data 118 from storage. In the present example, the second domain 112 locates the particular customer name identified by number in the request 116 within storage (e.g., data 722). The customer name "DAVIS" is then retrieved from storage.

Block 906 encodes the response data 118 using image pixel data 416. In the present example, the encoding module 120 cross-references the string 406 element matching the customer name "DAVIS" against correlated parameter values 408-414 for respective canvas images 420. Specifically, the encoding module 120 identifies pixel color and transparency values 408-414 within the data structure 404 associated with the customer name "DAVIS". These respective pixel parameters define image pixel data 416.

Block 908 generates one or more canvas images 420 using the image pixel data 416. In the present example, the image pixel data 416 is passed from the encoding module 120 to the markup language generator module 418. The markup language generator module 418 generates a canvas image 420 having a pixel defined by the color and transparency values 20, 90, 45 and 80, respectively. Thus, the sought-after customer name, "DAVIS", has been encoded using a single canvas image 420 file.

Block 910 provides the images. In the present example, the second domain 112 sends the canvas image 420 to the browser module 106 of the client device 102. The client device 102 may decode the canvas image 420 and construct the customer name "DAVIS" for presentation to the user 104 in accordance with methods and resources as described above.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

The computer readable storage medium can be any one of an electronic storage medium, a magnetic storage medium, an optical storage medium, a quantum storage medium and so forth. Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations.

Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A system comprising a server, the server configured to:
receive a request for data from a browser configured to implement a single origin policy, the browser rejecting one or more content types received from other than a first domain in accordance with the single origin policy, the browser accepting one or more image types received from other than the first domain in accordance with the single origin policy;
encode the requested data using an encoding scheme;
generate an image characterized by respective height and width dimensions, the height and width dimensions associated with the encoding scheme, the image referenced using markup language elements; and
provide the image to the browser in response to the request.

2. The system of claim 1, the server further configured to generate the image further characterized by a single predefined color.

3. The system of claim 1, the server further configured to generate the image further characterized by color content, the color content of the image associated with the encoding scheme.

4. The system of claim 3, the request for data including a filename, the server further configured to retrieve the requested data from storage in accordance with the filename, the image including the filename within one of the markup language elements.

5. A method, comprising:
receiving information from a first domain at an apparatus, the first domain including one or more web servers;
issuing a request to a second domain, the second domain including one or more web servers, the second domain different than the first domain;
receiving one or more images at the apparatus;
enforcing a single origin policy at the apparatus, including rejecting some data types and accepting the one or more images;
identifying respective decoding schemes based on one or more characteristics of individual ones of the one or more images; and
generating decoded data using the decoding schemes.

6. The method of claim 5, wherein the individual ones of the one or more images are characterized by a single predetermined color, and wherein the respective decoding schemes are identified using the one or more images characterized by the single predetermined color.

7. The method of claim 5, wherein the individual ones of the one or more images are characterized by pixels with color values, and wherein the respective decoding schemes are identified using the color values of the pixels within the one or more images.

8. The method of claim 5, wherein the single origin policy further includes rejecting executable files from the second domain.

9. The method of claim 5, wherein the request includes an indication to respond using the one or more images encoded according to a markup language, and wherein the request further includes a filename corresponding to an object of the request.

10. The method of claim 5, the identifying including cross-referencing the respective decoding schemes within a data structure using the one or more characteristics of the one or more images.

11. The method of claim 5, the identifying the respective decoding schemes performed using the one or more characteristics of the one or more images as arguments within a mathematical function.

12. The method of claim 5, wherein the one or more images encode visually presentable content consistent with a unified class of subject matter.

13. The method of claim 5, wherein the one or more characteristics of the one or more images include respective height and width dimensions quantified in units of pixels.

14. A computer-readable storage device including a program code, the program code configured to cause one or more processors to:
  receive a request for information, the request indicating that the information is to be encoded using images, the request originating from an apparatus that is configured to apply a single origin policy that includes rejecting some data types and accepting the images;
  retrieve the requested information from one or more storage resources;
  encode the requested information using one or more encoding schemes, the one or more encoding schemes corresponding to media file attributes;
  generate media files respectively characterized by the media file attributes; and
  provide the media files in response to the request.

15. The computer-readable storage device of claim 14, the program code further configured such that the media files are characterized by image content of a single color, the single color determined in accordance with an information encoding scheme.

16. The computer-readable storage device of claim 14, the program code further configured such that the media file attributes include pixels of respective colors.

17. The computer-readable storage device of claim 14, the program code further configured such that the media file attributes include image height dimensions and image width dimensions.

18. The computer-readable storage device of claim 14, the request further indicating one or more filenames corresponding to the requested information, the program code further configured such that the retrieving is performed based on the one or more filenames.

19. The computer-readable storage device of claim 14, individual ones of the media file attributes corresponding to respective markup language elements for defining the images.

20. The computer-readable storage device of claim 14 further comprising a data structure, the media file attributes arranged as respective sets within the data structure, the encoding schemes associated with the sets in one-to-one correspondence.

* * * * *